(12) United States Patent
Yamaji et al.

(10) Patent No.: US 6,249,330 B1
(45) Date of Patent: Jun. 19, 2001

(54) DISPLAY DEVICE AND MANUFACTURING METHOD

(75) Inventors: Toshifumi Yamaji, Haguri-Gun; Nobuhiko Oda, Hashima, both of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/160,839

(22) Filed: Sep. 25, 1998

(30) Foreign Application Priority Data

Sep. 30, 1997 (JP) .................................................... 9-266681

(51) Int. Cl.[7] .................................................. G02F 1/1333
(52) U.S. Cl. ............................ 349/122; 349/43; 349/138
(58) Field of Search ................................. 349/42, 43, 122, 349/138

(56) References Cited

U.S. PATENT DOCUMENTS 5,956,105 * 9/1999 Yamazaki et al. ..................... 349/43

FOREIGN PATENT DOCUMENTS

07056190 * 3/1995 (JP) .

* cited by examiner

Primary Examiner—James A. Dudek
(74) Attorney, Agent, or Firm—Cantor Colburn LLP

(57) ABSTRACT

A gate electrode, silicon nitride film, silicon oxide film and silicon film are formed on an insulating substrate. A silicon oxide film and silicon nitride film are formed on the silicon film, and first and second contact holes are formed which penetrate these films. An electrode in contact with a drain area is arranged via the first contact hole. The whole is covered with a plagiarizing film, a third contact hole of smaller diameter than that of the second contact hole is formed corresponding to the second contact hole embedded by the planarizing film, and a transparent electrode in direct contact with a source area is arranged via the third contact hole. In this way, the contact resistance between the transparent electrode and the source area is reduced, and a simplified construction display device is obtained wherein the contact reliability of both electrodes is improved.

12 Claims, 6 Drawing Sheets

DISPLAY DEVICE AND MANUFACTURING METHOD

BACKGROUND OF THE INVENTION

1. Field of the Invention

This invention relates to a display device such as a liquid crystal display device which use a TFT (TFT: Thin Film Transistor) as a pixel drive element, and to a method of manufacturing such a device.

2. Description of the Prior Art

FIG. 1 is a cross-sectional view showing a bottom gate thin film transistor structure used as a switching element for a liquid crystal display panel.

A gate electrode 2 of a refractory metal is arranged on the surface of a transparent, insulating substrate 1.

This gate electrode 2 has a taper shape wherein its width expand toward the transparent substrate 1. A silicon oxide film 4 is formed on the transparent substrate 1 on which the gate electrode 2 is arranged via a silicon nitride film 3.

The silicon nitride film 3 prevents infiltration of impurities contained in the transparent substrate into an active layer, described later. The silicon oxide film 4 functions together with the silicon nitride film 3 as a gate insulating film.

A polycrystalline silicon film 5 is formed on the silicon oxide film 4 so as to transverse over the gate electrode 2.

This polycrystalline silicon film 5 is the active layer of the thin film transistor.

A stopper insulating film 6 comprising an insulating material such as silicon oxide is arranged on the polycrystalline silicon film 5. The area of the polycrystalline silicon film 5 covered by this stopper insulating film 6 is a channel area 5c. Other areas of the polycrystalline silicon film 5 are a source area 5s and a drain area 5d.

A silicon oxide film 7 and silicon nitride film 8 are formed on the polycrystalline silicon film 5 on which the stopper insulating film 6 is formed. This silicon oxide film 7 and silicon nitride film 8 protect the polycrystalline silicon film 5 which comprises the source area 5s and drain area 5d.

A contact hole 9 is formed in a predetermined part of the silicon oxide film 7 and silicon nitride film 8 on the source area 5s and drain area 5d. An aluminum electrode 10 connected through this contact hole 9 to the source area 5s and drain area 5d is arranged on the silicon nitride film 8. A planarizing film 11 which is insulating and is transparent to visible light is formed on the silicon nitride film 8 on which the aluminum electrode 10 is arranged. This planarizing film 11 covers imperfections due to the gate electrode 2 or stopper insulating film 6 and makes the surface smooth. A contact hole 12 is formed in the planarizing film 11 on the aluminum electrode 10 on the source area 5s. A transparent electrode 13 made of an ITO (Indium-Tin-Oxide) film connected to the aluminum electrode 10 via this contact hole 12 is arranged so that it extends over the planarizing film 11. This transparent electrode 13 constructs pixel electrode of a liquid crystal display panel.

In this thin film transistor, image data supplied to the aluminum electrode 10 on the drain area is applied to the transparent electrode 13 in response to a scanning control signal applied to the gate electrode 2.

However, the contact resistance of the ITO film was high relative to the aluminum electrode 10, and faulty contacts often occurred. To solve this, there is a technique whereby the contact resistance is lowered by using a high melting metal such as molybdenum (Mo), for example, on the surface of the aluminum electrode 10, but as a molybdenum sputtering step is required after the aluminum sputtering step, there was a disadvantage in that the manufacturing process became complex.

SUMMARY OF THE INVENTION

According to this invention, which was conceived in view of the aforesaid problems in the prior art, a contact hole in a planarizing film and a contact hole in an insulating film (silicon oxide and silicon nitride) are connected, and a transparent electrode is brought into direct contact with either a source area or a drain area.

By bringing the transparent electrode into direct contact with the surface of the semiconductor film, according to this invention, a thin film transistor of simplified construction can be obtained without increasing contact resistance.

Moreover, by forming the contact hole (second contact hole) in the insulating film (silicon oxide film and silicon nitride film) to be larger than the contact hole (third contact hole) in the planarizing film, the inner wall of the contact hole in the insulating film is covered by the planarizing film material.

Further, as there is no step in the inner wall of the third contact hole, this invention also has the advantage that disconnects in the transparent contact part are prevented.

DESCRIPTION OF THE PREFERRED EMBODIMENTS

Figure 1:
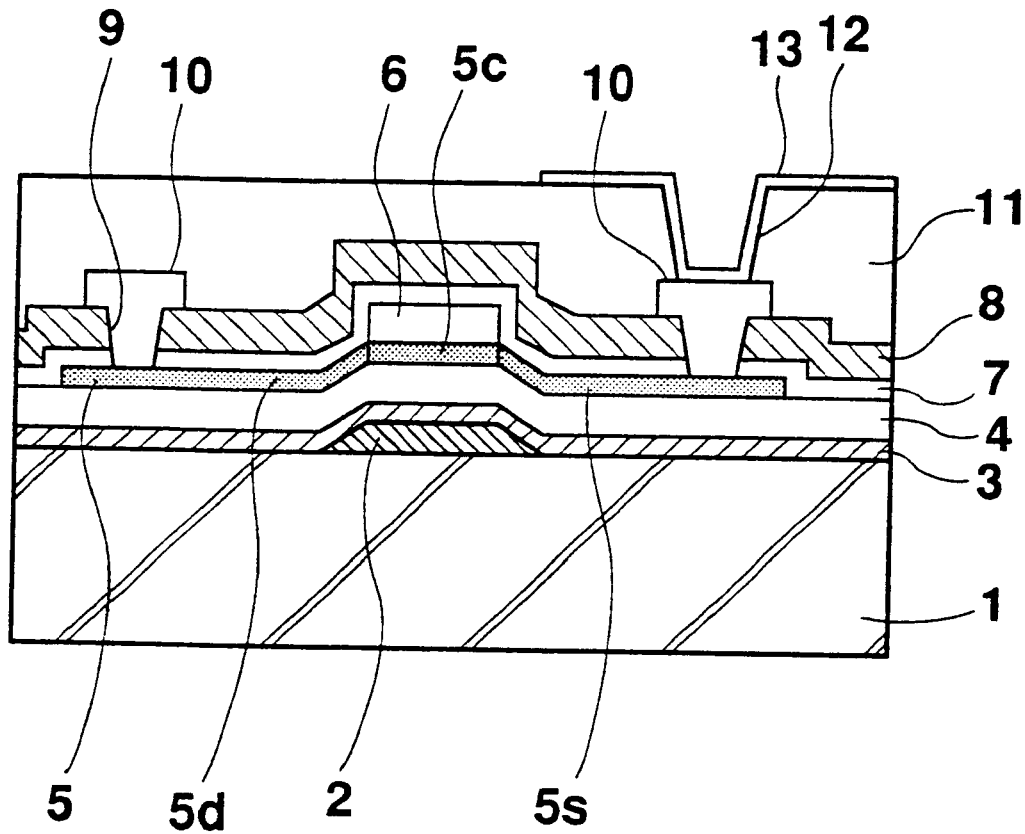
FIG. 1 is a sectional view for the purpose of describing a thin film transistor according to the prior art.

Next, one embodiment of this invention will be described in detail referring to the drawings.

Figure 2:
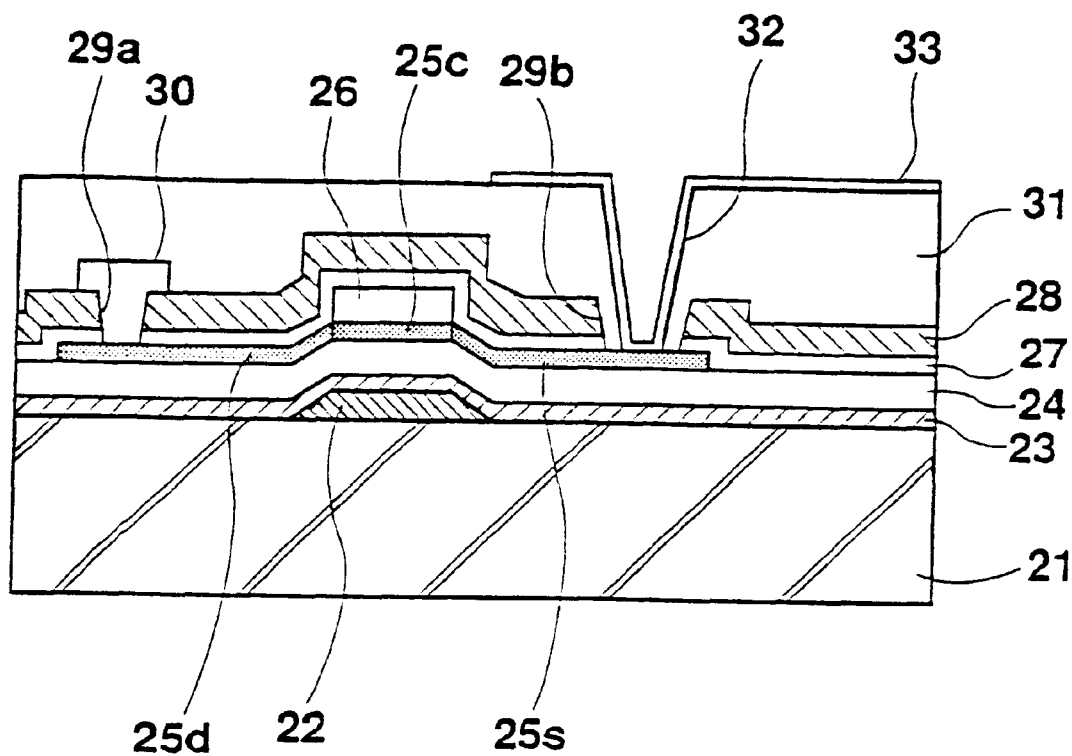
FIG. 2 is a sectional view showing a thin film transistor according to this invention.

FIG. 2 is a cross-sectional view showing a bottom gate thin film transistor structure used as a switching element for a liquid crystal display panel according to this invention.

A gate electrode 22 comprising a refractory metal such as chromium (Cr) is arranged on the surface of a transparent, insulating substrate 21 of non-alkali glass or the like. This gate electrode 22 is formed in a taper shape wherein its width expand toward the side of the transparent substrate 21. A silicon oxide film 24 is formed on the transparent substrate 21 on which the gate electrode 22 is arranged via a silicon nitride film 23. The silicon nitride film 23 prevents infiltration of impurities such as sodium (Na) contained in the transparent substrate 21 into an active layer, described later. The silicon oxide film 24 functions together with the silicon nitride film as a gate insulating film. A polycrystalline silicon 25 (semiconductor film) is formed on the silicon oxide film 24 so as to transverse over the gate electrode 22. This polycrystalline silicon film 25 is the active layer of the thin film transistor.

A stopper insulating film 26 made of an insulating material such as silicon oxide is arranged on the polycrystalline silicon film 25. An area of the polycrystalline silicon film 25 covered by this stopper insulating film 26 is a channel area 25c, and the other areas of the polycrystalline silicon film 25 are a source area 25s and drain area 25d. A silicon oxide film 27 and silicon nitride film 28 are formed on the polycrystalline silicon film 25 on which the stopper insulating film 26 is formed. This silicon oxide film 27 and silicon nitride film 28 protect the polycrystalline silicon film 25 which comprises the source area 25s and drain area 25d.

A first contact hole 29a is formed in a predetermined part of the silicon oxide film 27 and silicon nitride film 28 on the drain area 25d. An aluminum electrode 30 connected to the drain area 25d via this first contact hole 29a is arranged on the silicon nitride film 28 and in the first contact hole 29a. Refractory metals such as molybdenum (Mo) and titanium (Ti) may be arranged at the interface of the aluminum electrode 30 and drain area 25d to decrease the contact resistance of these components. A second contact hole 29b which exposes the surface of the source area 25s is formed in a predetermined part of the silicon oxide film 27 and silicon nitride film 28 on the source area 25s.

An insulating planarizing film 31 comprising a film of thickness 1.0–1.5 μm which is transparent to visible light of, for example, acrylic resin, polyimide resin or SOG, is formed on the silicon nitride 28 on which the aluminum electrode 30 is arranged. This planarizing film 31 covers asperities due to the gate electrode 22, aluminum electrode 30 and stopper insulating film 26, and flattens the surface. A third contact hole 32 is formed to expose the surface of the source area 25s in the planarizing film 31 at a position corresponding to the second contact hole 29b on the source area 25s. A transparent electrode 33 connected to the source area 25s via the third contact hole 32 is also arranged to extend over the acrylic resin film 31. This transparent electrode 33 comprises an ITO film of film thickness 800–1000 Å, and functions as a display electrode of a liquid crystal display panel.

The third contact hole 32 formed in the planarizing film 31 has an opening of, for example, 6×6 μm (on a CAD drawing), the second contact hole 29b formed in the silicon nitride film 28 and silicon oxide film 27 has an opening of, for example, 10×10 μm (on a CAD drawing), and the centers of the two coincide. Therefore, the third contact hole 32 is formed in the second contact hole 29b, and the surfaces of the silicon nitride film 28 and silicon oxide film 27 exposed on the side wall (inner wall) of the second contact hole 29b are covered by the material of the planarizing film 31.

Next, a method of forming the thin film transistor shown in FIG. 2 according to this embodiment of the invention will be described referring to FIGS. 3A, 3B, 3C, 3D, 3E, 3F, 3G, 3H.

(a) Step 3A

A refractory metal such as chromium or molybdenum is sputtered on the non-conducting transparent substrate 21 to give a refractory metal film 40 of thickness 700 to 1500 Å.

Figure 3A:
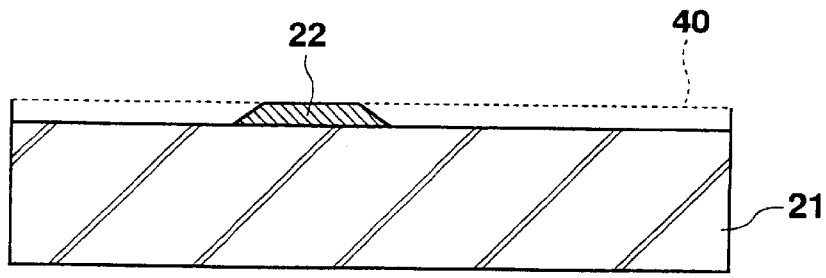
FIGS. 3A, 3B, 3C, 3D, 3E, 3F, 3G and 3H are sectional views for the purpose of describing steps in a thin film transistor manufacturing method.

This high melting metal film 40 is patterned to a predetermined shape so as to form a gate electrode 22. In this patterning, the gate electrode 22 is patterned by wet etching into a taper shape (trapezoidal shape) wherein its width is expanded toward the transparent substrate 21 (FIG. 3A).

(b) Step 3B

Figure 3B:
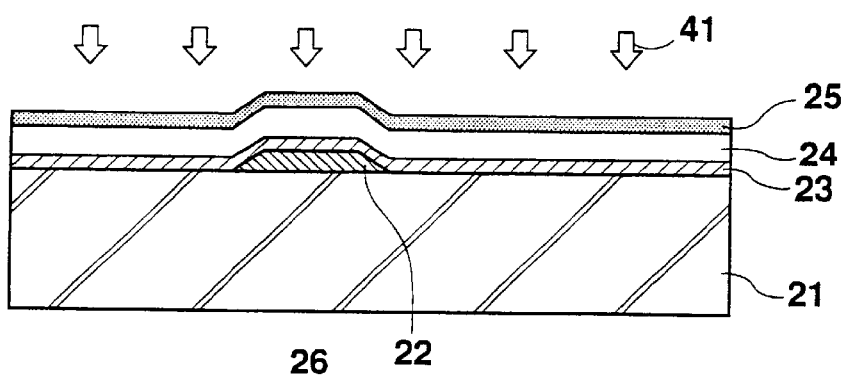

A silicon nitride film of thickness 500–1500 Å and a silicon oxide film of thickness 1000–2000 Å are successively deposited by plasma CVD on the transparent electrode 21 so as to cover the gate electrode 22, thereby forming a silicon nitride film 23 and silicon oxide film 24. Next, silicon is deposited by plasma CVD on the silicon oxide film 24 to a thickness of 300–800 Å to form an amorphous silicon film 25. The whole is heated at 400 to 500° C. to remove excess hydrogen ions occluded in the silicon film 25. The silicon film 25 is irradiated by an excimer laser 41 to heat the amorphous silicon until it melts. This causes the silicon to crystallize to a polycrystalline state. This polycrystalline silicon film 25 becomes the active layer of the thin film transistor (FIG. 3B).

(c) Step 3C

Figure 3C:
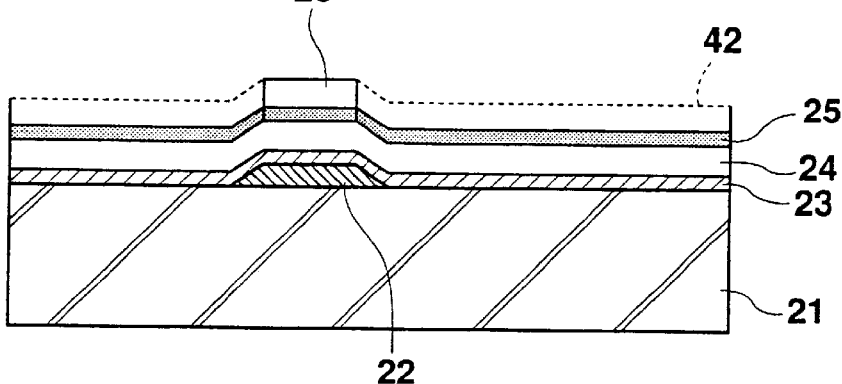

Silicon oxide is laminated on the silicon film 25 to a thickness of 1000–2000 Å so as to form a silicon oxide film 42. This silicon oxide film 42 is patterned to match the shape of the gate electrode 22 so as to form a stopper insulating film 26 over the gate electrode 22. In forming this stopper insulating film 26, a photoresist film covering the silicon oxide film 42 is formed, and a resist mask is formed on top of the silicon oxide film 24 by exposing the resist film from the side of the transparent substrate 21 using the gate electrode 22 as a mask. The resist mask is disposed without misalignment because no photo mask is used and the resist mask is self-aligned in the above exposing process. The silicon oxide film 42 is then patterned by wet etching with an HF and so on (FIG. 3C).

(d) Step 3D

Figure 3D:
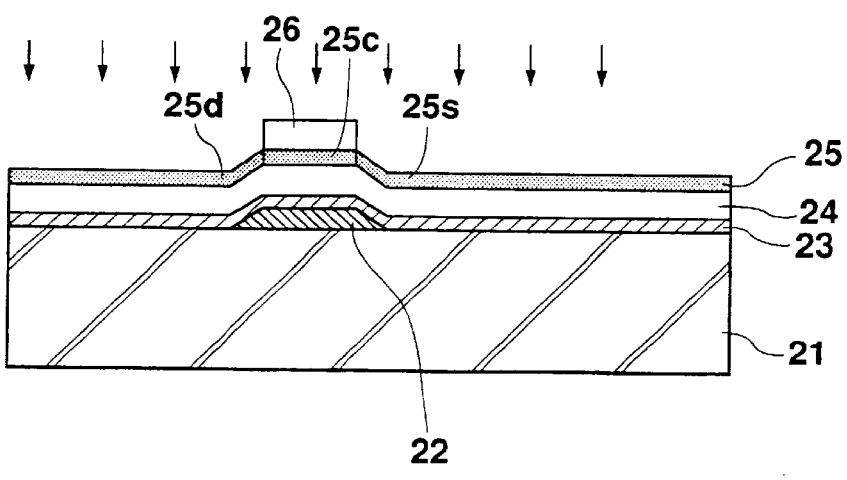

P-type or N-type ions are doped in the silicon film 25 on which the stopper insulating film 26 is formed, corresponding to the transistor type to be formed. Specifically, to form a P channel transistor, P-type ions such as boron (B) are doped, and to form an N channel transistor, N-type ions such as phosphorus (P) are doped. In this doping, areas are formed showing P-type or N-type conductance on the silicon film 25 excluding the area covered by the stopper insulating film 26. These areas become the source area 25s and drain area 25d on either side of the gate electrode 22. The area covered by the stopper insulating film 26 becomes the channel area 25c (FIG. 3D).

(e) Step 3E

Figure 3E:
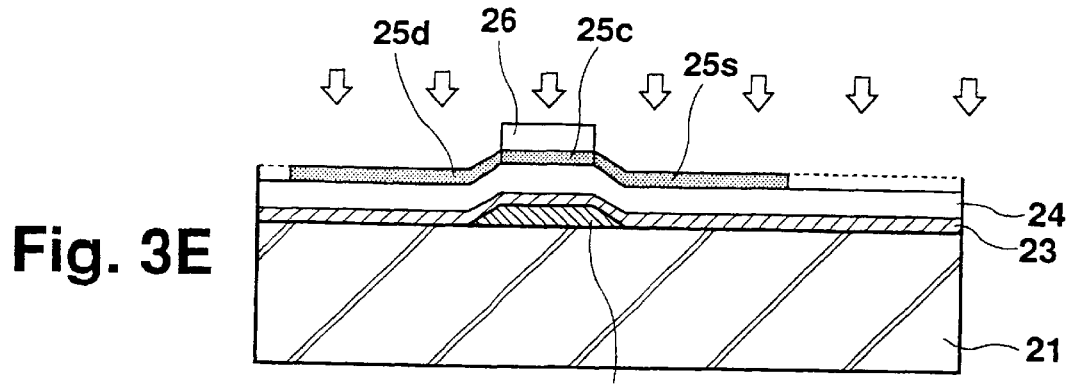

The silicon film 25 into which ions of impurities of a predetermined conductance type have been doped are irradiated by an excimer laser to heat it to the extent that the silicon does not melt. This activates the ions of impurities in the silicon film 25. Transistors are then separately formed by patterning the silicon film 25 with removes leaving a predetermined width on both sides of the gate electrode 22 (FIG. 3E).

(f) Step 3F

Silicon oxide and silicon nitride are again formed by plasma CVD to cover the silicon film 25 on the silicon oxide film 24, thereby forming a silicon oxide film 27 and silicon nitride film 28. Next, the silicon oxide film 27 and silicon nitride film 28 are annealed by heating to 400–600° C. This heat treatment also causes hydrogen ions occluded in the silicon nitride film 28 to diffuse through the silicon oxide film 27 into the silicon film 25. The diffused hydrogen ions neutralize and terminate dangling bonds in the silicon film 25.

Figure 3F:
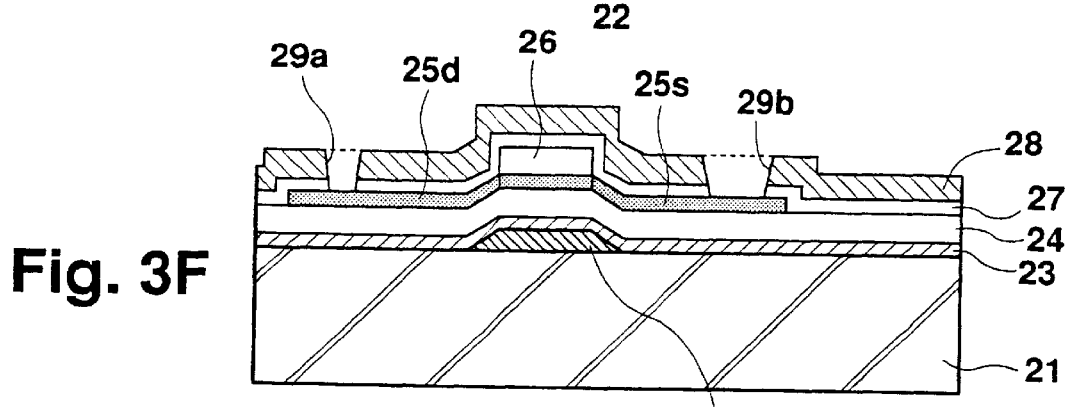

First and second contact holes 29a, 29b are formed through the silicon oxide film 27 and silicon nitride film 28 so as to expose the surfaces of the silicon film 25 which will become the source area 25s and drain area 25d (FIG. 3F).

(g) Step 3G

Figure 3G:
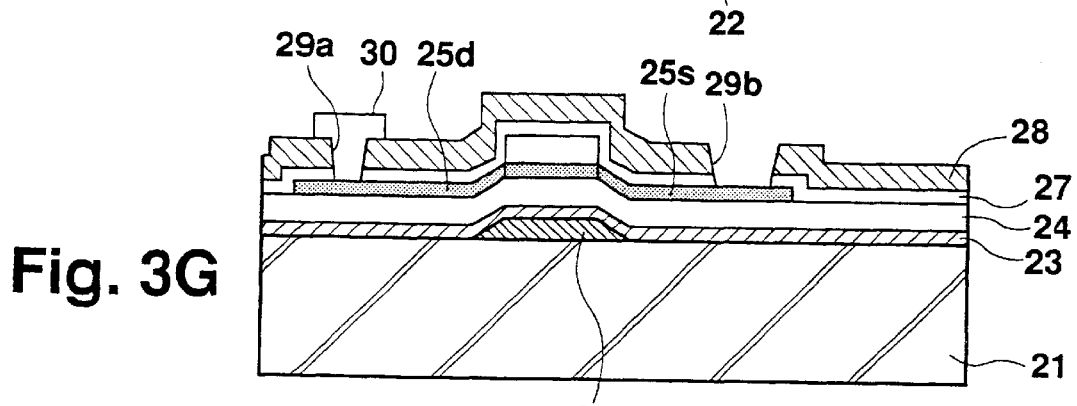

An electrode 30 comprising a metal such as aluminum connected to the drain area 26d of the silicon film 25 is formed in the first contact hole 29a. This aluminum electrode 30 is for example formed in the first contact hole 29a by patterning aluminum sputtered on the silicon nitride film 28 in which the first and second contact holes 29a, 29b are formed. If high melting metals such as molybdenum (Mo) and titanium (Ti) are to be deposited at the interface of the aluminum electrode 30 and drain area 25d, films of these metals and aluminum are successively sputtered, and these are then successively patterned. In any case, neither aluminum nor a high melting metal are formed in the second contact hole 29b, and the surface of the silicon film 25 in the source area 25s is exposed at the bottom of the second contact hole 29b. Herein, the aluminum electrode 30 connected to the drain area 25d is continuous in the alignment direction of the transistor so as to construct a drain line in a integrated construction (FIG. 3G).

(h) Step 3H

An acrylic resin solution is spin-coated on the silicon nitride film 28 on which the aluminum electrode 30 is formed, and this is baked to form the planarizing film 31. This planarizing film 31 covers imperfections due to the aluminum electrode 30 or stopper insulating film 26 and makes the surface smooth. The planarizing film 31, of course, also covers the inside of the second contact hole 29b. A third contact hole 32 penetrates the planarizing film 31 so as to expose part of the surface of the source area 25s. This third contact hole 32 is formed, for example, by using a resin having identical photosensitivity to that of a photoresist as the acrylic resin layer, exposing using a metal mask from the side of the planarizing film 31, developing and removing the points selectively exposed to light, and performing reflow.

Figure 3H:
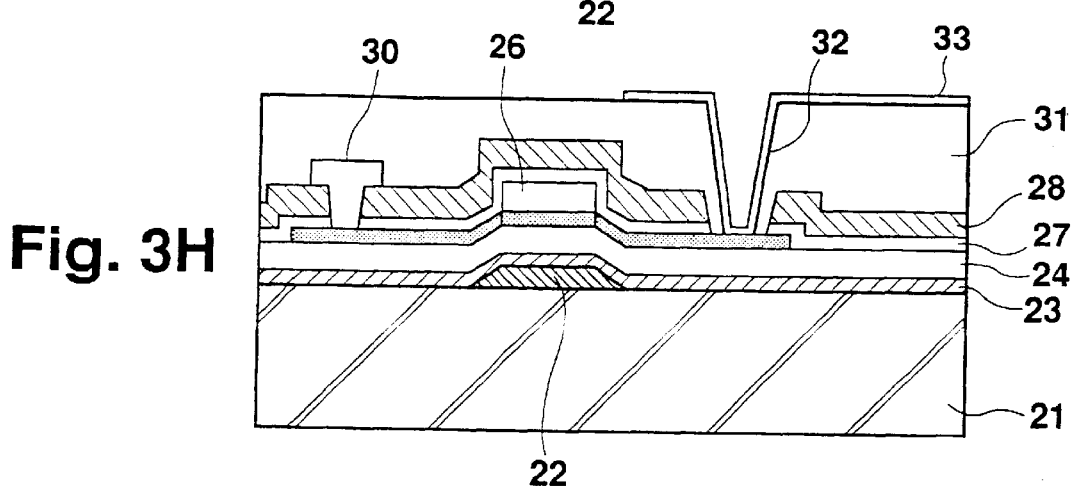

A transparent electrode 33 comprising ITO or the like connected to the source area 25s is formed in the third contact hole 32. This transparent electrode 33 is formed, for example, by cleaning the surface of the polycrystalline silicon film 25 inside the contact hole 32 by slight etching with a hydrofluoric acid etchant, and then patterning sputtered ITO on the planarizing film 31 (FIG. 3H).

The form of the invention as described hereabove offers the following benefits and advantages:

(1) As the ITO film is in direct contact with the polycrystalline silicon film 25 in the source area 25s via the second and third contact holes 29b, 32, contact resistance can be lowered compared to that when aluminum and the ITO film are in contact.

(2) Means to reduce the contact resistance of aluminum, such as refractory metals, are unnecessary, so the construction is simplified, and costs can be reduced.

The following additional advantages are obtained by reducing the size of the third contact hole 32 to be less than the size of the second contact hole 29b:

(1) The acrylic resin film of the planarizing film 31 covers the second contact hole 29b and the third contact hole 32 penetrates to the polycrystalline silicon film 25 of the source area 25s, so the side wall of the third contact hole can be made a smooth surface, and factors which might cause disconnections, etc., in the contact part of the transparent electrode 33 are excluded.

(2) As the inner wall of the second contact hole 29b is covered by the material of the planarizing film 31, in the above-mentioned step 3H, the silicon oxide film 27 and silicon nitride film 28 are not needlessly etched by the hydrofluoric acid etchant which cleans the surface of the polycrystalline silicon film 25. As a result, the formation of undesirable steps in the contact part between the source area 25s and the transparent electrode 33 are prevented.

This invention can be applied not only to a bottom gate thin film transistor, but also to a top gate thin film transistor wherein the gate electrode 22 is situated above the polycrystalline film 25. An example of application to a top gate thin film transistor will now be given as another embodiment of this invention.

Figure 4:
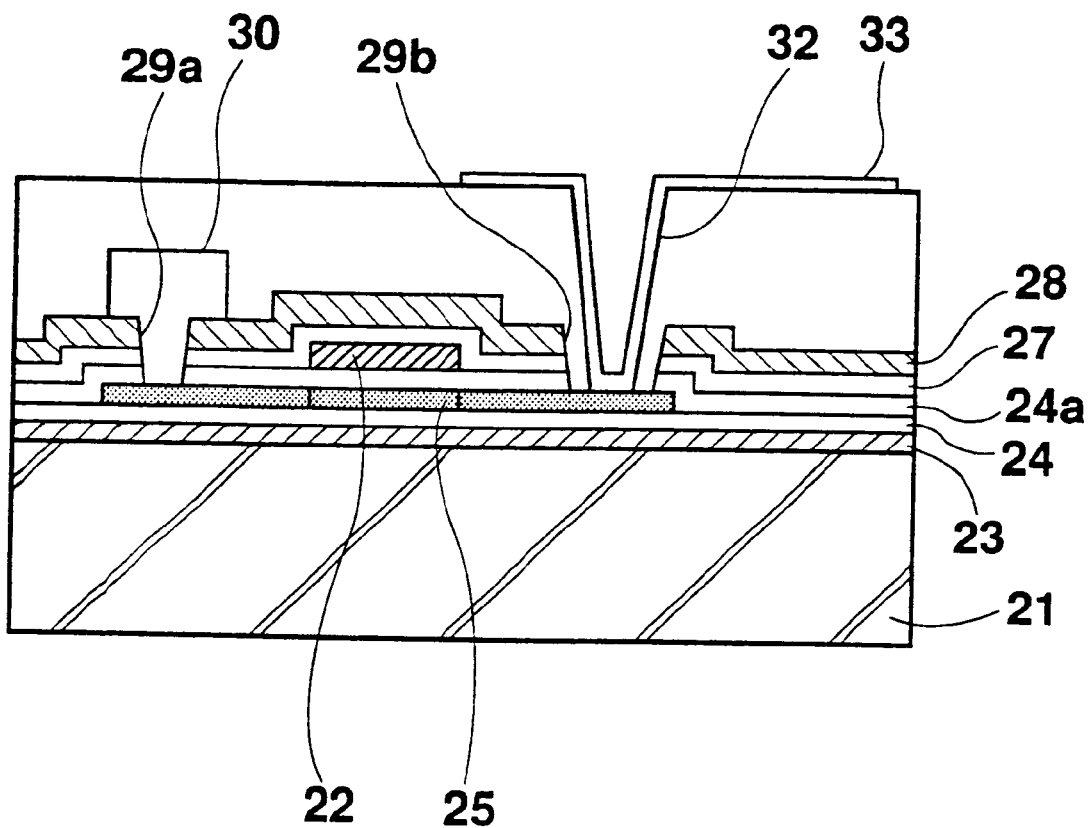
FIG. 4 is a sectional view of a thin film transistor according to another embodiment of this invention.

FIG. 4 shows a cross-section of a top gate thin film transistor used as a switching element for the display of a liquid crystal display panel.

The silicon nitride film 23 and silicon oxide film 24 are formed on the surface of the insulating transparent substrate 21. The silicon nitride film 23 prevents separation of ions of impurities such as sodium contained in the transparent substrate 21, and the silicon oxide film 24 permits disposition of the polycrystalline silicon film 25 which becomes the active layer. The polycrystalline silicon film 25 is formed on a predetermined area of the silicon oxide film 24. This polycrystalline silicon film 25 becomes the active layer of the thin film transistor.

A silicon oxide film 24a, which becomes a gate insulating film, is formed on the silicon oxide film 24 on which the polycrystalline silicon film 25 is formed. The gate electrode 22 made of a refractory metal is formed on the silicon oxide film 24a so as to extend in a direction which intersects with the polycrystalline silicon film 25. The area of the polycrystalline silicon film 25 covered by the gate electrode 22 becomes the channel area 25c, and the other areas of the polycrystalline silicon film 25 become the source area 25s and drain area 25d.

The silicon oxide film 27 and silicon nitride film 28 are formed on the silicon oxide film 24a on which the gate electrode 22 is arranged. This silicon oxide film 27 and silicon nitride film 28 construct an interlayer insulating film which protects the gate electrode 22 and polycrystalline silicon film 25.

The first and second contact holes 29a, 29b are formed at predetermined positions in the silicon oxide films 24a, 27 and the silicon nitride film 28 on the source area 25s and drain area 25d. The aluminum electrode 30 connected to the drain area 25d via the first contact hole 29a is formed on the silicon nitride film 28 and in the first contact hole 29a. The aluminum electrode is not formed in the second contact hole 29b on the source area 25s.

The planarizing film 31, made of a insulating material which is transparent to visible light such as acrylic resin, polyimide resin or SOG, for example, is formed on the silicon nitride film 28 on which the electrode 30 is arranged, and in the second contact hole 29b. This planarizing film 31 covers asperities imperfections due to the presence of the gate electrode 22, aluminum electrode 30 and second contact hole 29b, and flattens the surface.

The third contact hole 32 is formed inside the second contact hole 29b in the planarizing film 31 on the source area 25s. The ITO film 33 which is in direct contact with the polycrystalline silicon film 25 in the source area 25s via the third contact hole 32 extends over the planarizing film 31. This ITO film 33 constitutes a pixel electrode of the liquid crystal display panel.

The method of manufacturing the top gate thin film transistor described above is based on that of the bottom gate type. Steps 5A, 5B, 5C, 5D, 5E and 5F of this manufacturing method will now be described simply referring to FIGS. 5A, 5B, 5C, 5D and FIG. 4.

(a) Step 5A

Figure 5A:
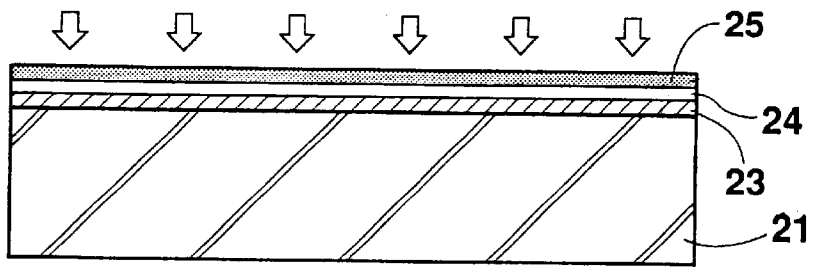
FIGS. 5A, 5B, 5C and 5D are sectional views for the purpose of describing steps in a thin film transistor manufacturing method according to another embodiment of this invention.

The silicon nitride film 23 and silicon oxide film 24 are successively deposited by plasma CVD on the insulating transparent substrate 21. Silicon is then deposited by plasma CVD so as to form the amorphous silicon film 25, and after dehydrogenation annealing, the silicon film 25 is heated by an excimer laser which converts it to a polycrystalline film (FIG. 5A).

(b) Step 5B

Figure 5B:
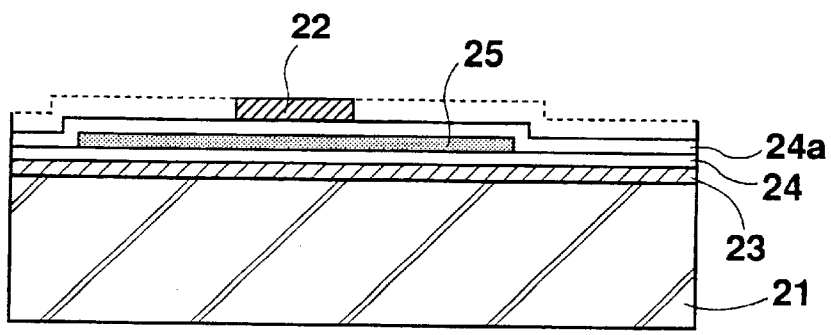

The silicon film 25 which is now polycrystalline is patterned to a predetermined shape corresponding to the position in which the transistor is to be formed. The silicon oxide film 24a which becomes the gate insulating film is deposited by plasma CVD to cover the silicon film 25. Subsequently, refractory metals such as chromium or molybdenum are sputtered to form a refractory metal film. This refractory metal film is patterned to a predetermined shape so as to form the gate electrode 22 (FIG. 5B).

(c) Step 5C

Figure 5C:
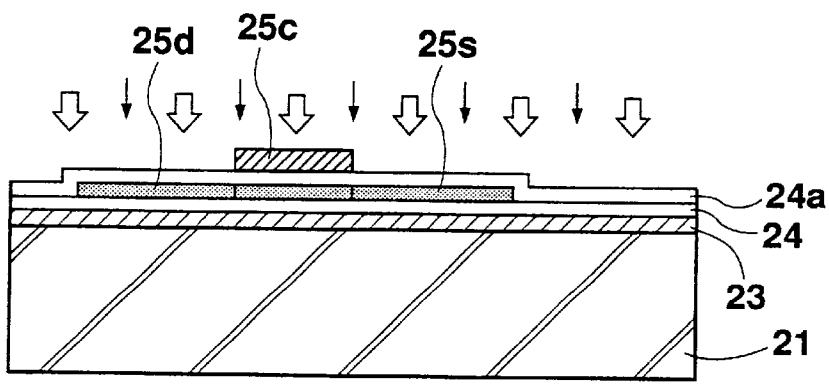

The silicon film 25 is doped with P-type or N-type ions corresponding to the type of transistor to be formed so as to form the source area 25s and drain area 25d. The silicon film 25 is then irradiated by an excimer laser to activate the ion impurities in the silicon film 25 (FIG. 5C.)

(d) Step 5D

Figure 5D:
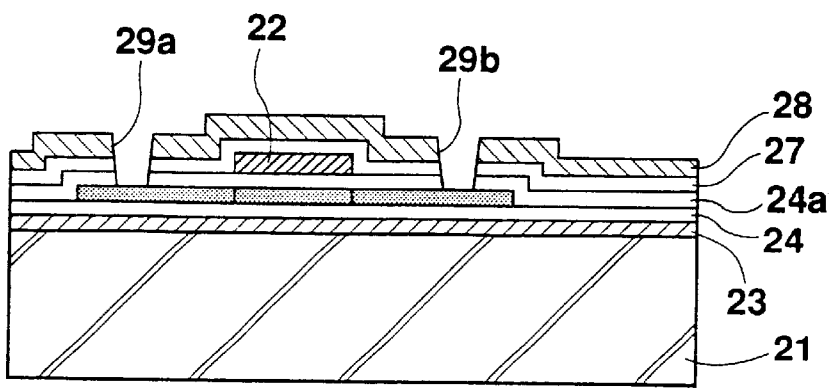

The silicon oxide film 27 and silicon nitride film 28 are successively formed by plasma CVD so as to cover the gate electrode 22 on the silicon oxide film 24a. By heating the whole substrate in a nitrogen atmosphere, hydrogen ions occluded in the silicon nitride film 28 are introduced into the silicon film 25 through the silicon oxide films 27, 24a. As a result, dangling bonds in the silicon film 25 are terminated by hydrogen ions (FIG. 5D).

(e) Step 5E

The first and second contact holes 29a, 29b which penetrate the silicon oxide films 27, 24a, and the silicon nitride film 28, are formed on the silicon film 25 which becomes the source area and drain area. The electrode 30 comprising a metal such as aluminum or the like connected to the silicon film 25, is formed in the first contact hole 29a (FIG. 4).

(f) Step 5F

The silicon nitride film 28 on which the electrode 30 is formed is coated, for example with an acrylic resin solution, and this is baked to form the planarizing film 31. The third contact hole 32 which penetrate the planarizing film 31 is formed so that it lies within the second contact hole 29b which is covered by the planarizing film 31 on the source area 25s, and the transparent electrode 33 made of ITO etc., connected to the source area 25s is formed in this third contact hole 32.

As a result of these steps, a top gate TFT device shown in FIG. 4 is obtained.

In the above description, an example was described wherein the second and third contact holes were formed to overlap each other so that the source area and the transparent electrode of the thin film transistor are in direct contact. However, the invention may be applied also to the case where the drain area and the transparent electrode are directly connected. In this case, the second contact hole covered by the planarizing film is formed on the drain region, and the third contact hole is formed inside the area of the second contact hole.

What is claimed is:

1. A display device comprising;
    a thin film transistor wherein a semiconductor film and gate electrode are formed on a substrate, a gate insulating film is interposed between said semiconductor film and said gate electrode, and a source area, drain area and channel area are formed in said semiconductor film,
    an insulating film covering said source and drain areas,
    first and second contact holes which penetrate said insulating film,
    an electrode which is in contact with one of said source and drain areas via said first contact hole,
    a planarizing film which covers said insulating film and said electrode,
    a third contact hole formed in said planarizing film, wherein said third contact hole is formed inside said second contact hole, and an inner wall of said second contact hole, and an inner wall of said second contact hole is covered by said planarizing film, and
    a transparent electrode formed on said planarizing film, said transparent electrode being in direct contact with the surface of said semiconductor film in the other of said source and drain areas via said third contact hole.

2. A display device as defined in claim 1, wherein said second contact hole is embedded by said planarizing film, and said third contact hole is formed with a smaller diameter than said second contact hole inside said second contact hole.

3. A display device as defined in claim 1, wherein
    said electrode is in contact with said drain area via said first contact hole,
    said second contact hole is formed on said source area,
    said third contact hole is formed with a smaller diameter than said second contact hole inside said second contact hole, and
    said transparent electrode is in direct contact with said source area via said third contact hole.

4. A display device as defined in claim 1, wherein the material of said transparent electrode is Indium Tin Oxide.

5. A method of manufacturing a display device, comprising:
    forming a semiconductor film and gate electrode on a substrate interposed a gate insulating film therebetween, and forming a source area, drain area and channel area in said semiconductor film,
    forming an insulating film covering said source and drain areas,
    forming first and second contact holes in said insulating film which expose the surface of said source and drain areas,
    forming an electrode which is in contact with one of said source and drain areas via said first contact hole,
    forming a planarizing film with a photosensitive material which covers said insulating film and said electrode,
    forming a third contact hole in said planarizing film, and
    forming a transparent electrode on said planarizing film, said transparent electrode being in direct contact with the surface of said semiconductor film in the other of said source and drain areas via said third contact hole.

6. A method of manufacturing a display device, comprising:
    forming a semiconductor film and gate electrode on a substrate interposed a gate insulating film therebetween, and forming a source area, drain area and channel area in said semiconductor film,
    forming an insulating film covering said source and drain areas,
    forming first and second contact holes in said insulating film which expose the surface of said source and drain areas,
    forming an electrode which is in contact with one of said source and drain areas via said first contact hole,
    forming a planarizing film which covers said insulating film and said electrode,
    forming a third contact hole in said planarizing film, said third contact hole being formed inside said second contact hole, and an inner wall of said second contact hole being covered by said planarizing film, and forming a transparent electrode on said planarizing film, said transparent electrode being in direct contact with the surface of said semiconductor film in the other of said source and drain areas via said third contact hole.

7. A method of manufacturing a display device, comprising:

forming a semiconductor film and gate electrode on a substrate interposed a gate insulating film therebetween, and for forming a source area, drain area and channel area in said semiconductor film, forming an insulating film covering said source and drain areas, forming first and second contact holes in said insulating film which expose the surface of said source and drain areas, forming an electrode which is in contact with one of said source and drain areas via said first contact hole, forming a planarizing film which covers said insulating film and said electrode, said second contact hole being embedded by said planarizing film, forming a third contact hole in said planarizing film, said third contact hole being formed with a smaller diameter than said second contact hole inside said second contact hole, and forming a transparent electrode on said planarizing film, said transparent electrode being in direct contact with the surface of said semiconductor film in the other of said source and drain areas via said third contact hole.

8. A method of manufacturing a display device, comprising:

forming a semiconductor film and gate electrode on a substrate interposed a gate insulating film therebetween, and for forming a source area, drain area and channel area in said semiconductor film, forming an insulating film covering said source and drain areas, forming first and second contact holes in said insulating film which expose the surface of said source and drain areas, said second contact hole being formed in said source area, forming an electrode which is in contact with one of said source and drain areas via said first contact hole, said electrode being in contact with said drain area via said first contact hole, forming a planarizing film which covers said insulating film and said electrode forming a third contact hole in said planarizing film, said third contact hole being formed with a smaller diameter than said second contact hole inside said second contact hole, and forming a transparent electrode on said planarizing film, said transparent electrode being in direct contact with the surface of said semiconductor film in the other of said source and drain areas via said third contact hole, said transparent electrode being in direct contact with said source area via said third contact hole.

9. A method of forming a display device as defined in claim 5, wherein the material of said transparent electrode Indium Tin Oxide.

10. The method of manufacturing a display device as defined in claim 6, wherein the material of said transparent electrode is Indium Tin Oxide.

11. The method of manufacturing a display device as defined in claim 7, wherein the material of said transparent electrode is Indium Tin Oxide.

12. The method of manufacturing a display device as defined in claim 8, wherein the material of said transparent electrode is Indium Tin Oxide.

* * * * *

UNITED STATES PATENT AND TRADEMARK OFFICE
CERTIFICATE OF CORRECTION

PATENT NO.   : 6,249,330 B1
DATED        : June 19, 2001
INVENTOR(S)  : Yamaji et al.

It is certified that error appears in the above-identified patent and that said Letters Patent is hereby corrected as shown below:

Title page,
Item [57], ABSTRACT,
Line 7, after "a" (first occurrence) delete "plagiarizing" and insert therefor
-- planarizing --.

Column 9,
Line 11, after "and" delete "for".

Signed and Sealed this

Fourth Day of January, 2005

JON W. DUDAS
*Director of the United States Patent and Trademark Office*